Feb. 2, 1932. L. D. SOUBIER 1,843,178
FLOWING GLASS
Original Filed March 7, 1919   2 Sheets-Sheet 1
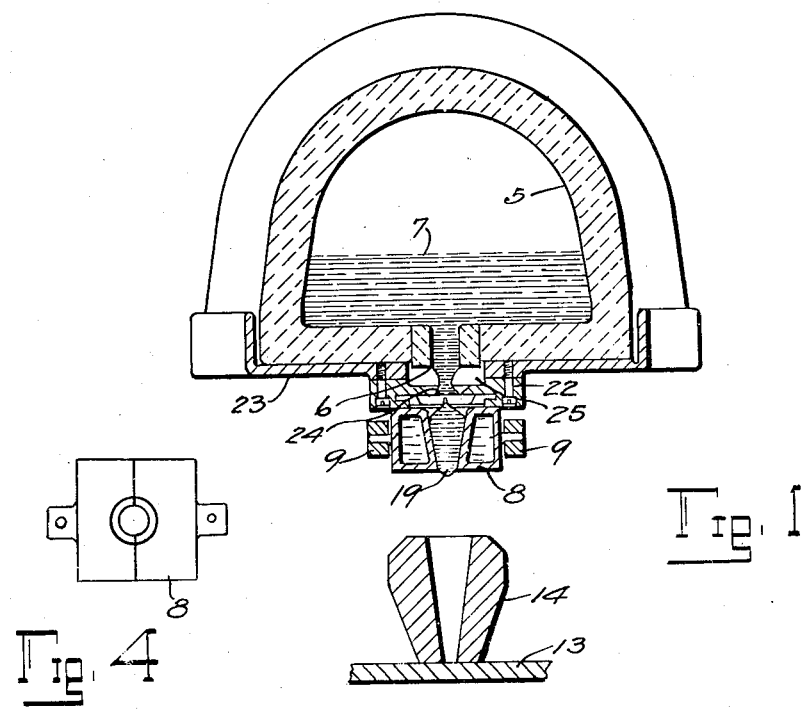
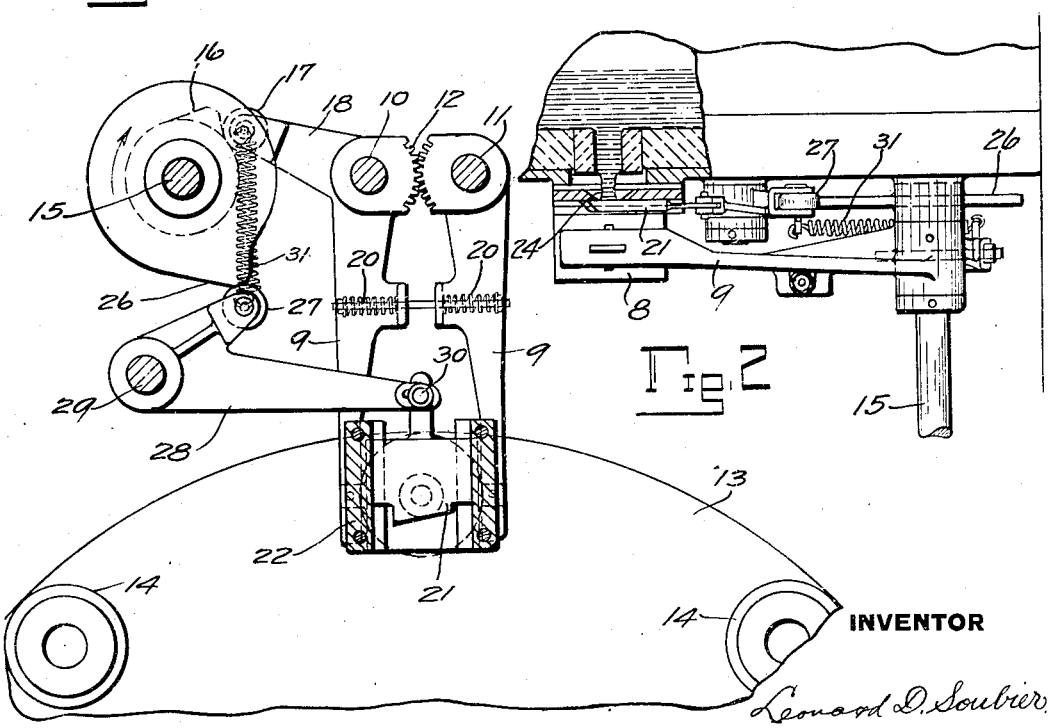
INVENTOR
Leonard D. Soubier
By J. F. Rule
His attorney Feb. 2, 1932. L. D. SOUBIER 1,843,178
FLOWING GLASS
Original Filed March 7, 1919  2 Sheets-Sheet 2

INVENTOR
Leonard D. Soubier.
By J. F. Rule.
His Attorney

Patented Feb. 2, 1932

1,843,178

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

FLOWING GLASS

Application filed March 7, 1919, Serial No. 281,269. Renewed August 15, 1927.

My invention relates to a method and means for flowing glass and segregating it into individual masses or gobs. There is at present in commercial use a method which consists in flowing a stream of glass from an outlet opening in a furnace into a divided cup or receptacle located a short distance below the opening. The stream of glass accumulates in the cup to form a gob. The cup sections are then separated, permitting the gob to drop, and a cutter then moves across the bottom of the cup to sever the discharged glass from the oncoming stream. As the gob drops from the cup the stream of glass forms a tail or extension thereof, the length of which depends on the quickness with which the cutter operates after the gob drops from the cup. This tail or extension is sometimes an objection, and it is impossible or impractical to sever the glass quickly enough after it drops to prevent it.

An object of the present invention is to avoid this difficulty, and to this end I provide a suitable arrangement for severing the glass above the cup, so that the gob may be separated from the stream before the cup opens.

Other features and advantages will appear hereinafter.

In the accompanying drawings:

Figure 1 is a sectional elevation through a boot or extension of a furnace and the gob forming apparatus.

Figure 2 is a similar view looking in a direction at right angles to that of Figure 1.

Figure 3 is a sectional plan view.

Figure 4 is a plan view of the divided cup.

Figure 5:
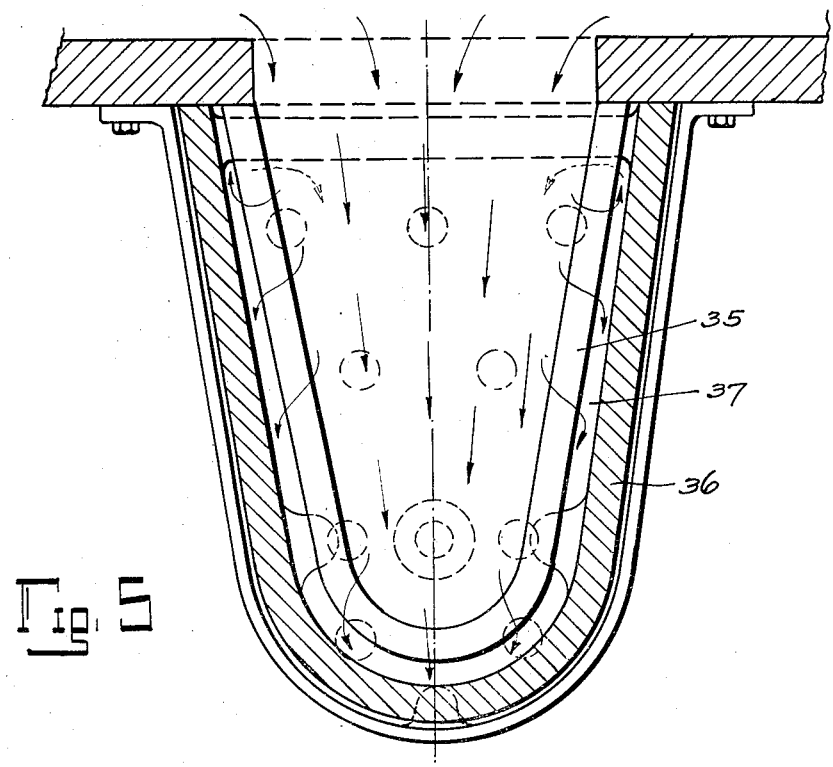
Figure 5 is a sectional plan view of a modified form of boot.

A boot or extension 5 of a melting furnace is provided in the bottom thereof with a flow opening 6 through which the molten glass 7 flows into a gob forming cup or temporary receptacle 8. The cup is made in two sections carried at the outer ends of swinging arms 9 mounted on vertical rock shafts 10 and 11, the latter having intermeshing segmental gears 12 to transmit movement from one arm to the other.

The glass forming machine comprises a mold carriage 13 which may be rotated either continuously or step-by-step to bring molds 14 carried thereby, successively into charging position, either directly beneath the cup 8, or at a charging station to which the gobs are conveyed, as for example, by means of an inclined chute. A cam shaft 15, preferably driven from the machine through suitable gearing, (not shown), is given one complete rotation for each advance of the mold carriage. A cam 16 on the shaft 15 engages a roll 17 on an arm 18 extending from the arm 9, and swings the latter to separate the cup sections, thereby permitting the accumulated gob 19 to drop from the cup into the mold directly therebeneath. Springs 20 return the cup sections.

Just before the cup opens to discharge the glass, a knife blade or cutter 21 operates to sever the accumulated gob from the oncoming stream of glass. This blade is mounted to slide horizontally in a guide plate or block 22. The latter is attached to a bottom plate 23 which forms a support for the boot 5. The plate 22 is formed with a central opening 24 for the passage of the glass. This opening is somewhat larger in diameter than the stream of glass, so that the latter does not touch the walls of said opening while the glass flows. The cutting edge of the blade 21 sliding in contact with the blade 22 severs the glass with a shearing cut. An enclosed space or chamber 25 is formed between the bottom of the boot and the plate 22, the latter forming the floor of the chamber. The air surrounding the glass in this chamber 25 is highly heated by the glass and furnace walls and the flowing glass thereby protected from chilling by the outside air.

The cutter 21 is reciprocated by means of a cam 26 on the cam shaft 15, said cam operating through a roller 27 on one arm of a bell crank lever 28 pivoted on a stud shaft 29, the other arm of the bell crank being connected at 30 to the cutter 21. The cam 26 is so arranged that it will advance the cutter to the Figure 3 position and sever the glass just before the cam 16 operates to separate the cup sections and drop the gob. The cup sections are only separated for a brief interval sufficient to permit the discharge of the glass. The knife serves as a temporary support for the oncoming glass during the brief interval that the cup 8 is open, the cutter being then quickly withdrawn by a spring 31. The cutter may be arranged to be withdrawn simultaneously with or just preceding the closing of the cup. The purpose of this quick operation of the cutter is to prevent it from being kept in contact with the glass for any appreciable length of time and thus avoiding chilling of the glass. The opening 24 may be of such size as to prevent the glass from accumulating on the plate 22 when arrested by the cutter. Any suitable means may be provided for cooling the cutter 21 and also for cooling the plate 22 when necessary to prevent the glass from sticking thereto.

The inner walls of the cup 8 are preferably tapered, as shown, to give the gob a suitable shape conforming closely to the shape of the mold cavity, the walls of which are also tapered. As shown in Fig. 1, the walls of the mold cavity taper downwardly somewhat more steeply than the inner walls of the cup 8. The lower end of the cup may be open, as shown, to permit the lower end of the gob of glass which has been slightly chilled by the cutter 21 to be reheated from the interior of the mass and also to draw downwardly or sag during the accumulation of the gob. This sagging of the glass serves to stretch or attenuate the surface layer of glass which may have been chilled by the cutter, permitting a more effective heating thereof, and also improves the shape of the gob for entering the mold. The cutter 21 is located a sufficient distance below the flow opening 6 to permit a continuous flow at said opening, although there may be a slight retardation of the flow when the knife operates.

Figure 6:
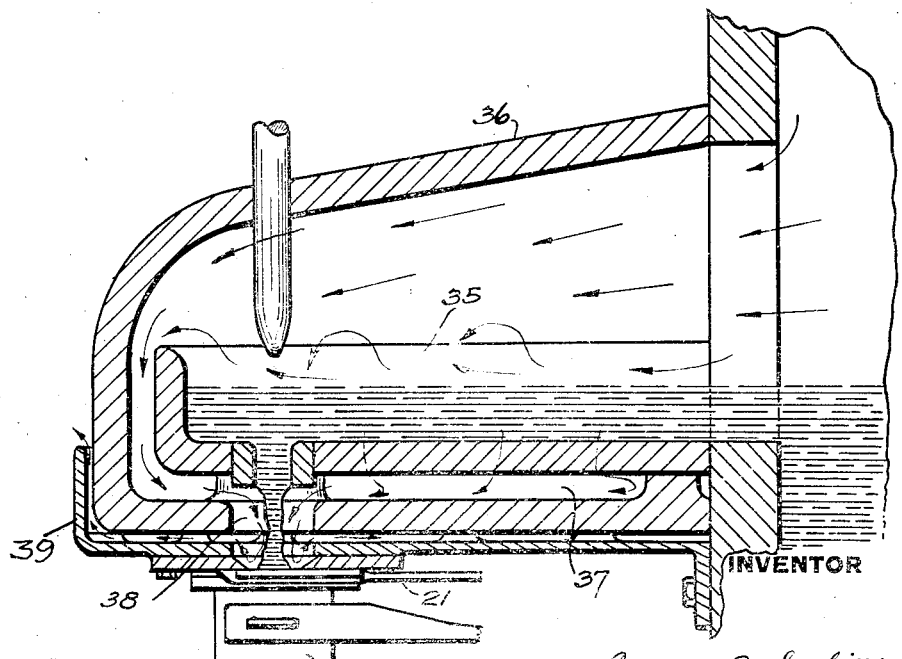
Figure 6 is a sectional elevation of the same.

Figures 5 and 6 illustrate a modification in which the boot or receptacle 35 is surrounded and enclosed by a separate casing 36, spaced from the receptacle to provide a passageway 37 for the circulation of the hot gases from the furnace. These hot gases flow downward from the space 37 through an opening 38 in the bottom of the casing, and thence between the bottom of the casing and a supporting plate 39 to the outside air. The highly heated gases passing through the opening 38 completely surround the stream of glass and prevent chilling of the glass, said opening 38 forming part of the heat chamber through which the glass flows to the cup 8.

Variations may be resorted to within the spirit and scope of my invention.

What I claim is:

1. The combination with a receptacle to contain molten glass and provided with an outlet opening through which the glass flows, of a receiving cup beneath said opening into which the glass flows, a cutter operable to sever the glass between said cup and the flow opening, said cutter being a sufficient distance below the flow opening to permit a continued flow of the glass and serving as a temporary support for the glass above it, and means forming a heat chamber surrounding and enclosing the glass between the flow opening and said cup.

2. The combination with a receptacle to contain molten glass and provided with an outlet opening through which the glass flows, of a receiving cup beneath said opening into which the glass flows, a cutter operable to sever the glass between said cup and the flow opening and support the glass above it while the cup is being discharged, and means forming a heat chamber surrounding and enclosing the glass in a highly heated atmosphere between the flow opening and said cup.

3. The combination with a receptacle to contain molten glass and provided with a discharge opening, of a divided cup beneath said opening into which the glass flows and accumulates to form a gob, a horizontally movable cutter at the level of the upper edge of the cup and operable periodically to sever the glass, means to prevent access of the outside air to the glass during its passage from the discharge opening to the cup, and means operable in synchronism with the cutter to separate the cup sections and drop the gob when said cutter operates.

4. The combination with a receptacle to contain molten glass and provided with a discharge opening in the bottom thereof, of a divided cup beneath said opening and spaced therefrom, means providing a heat chamber to surround the flowing glass between said receptacle and cup and preventing exposure of the glass to outside air, and a cutter operable periodically to sever the glass between said cup and opening.

5. The combination with a receptacle having a discharge opening through which molten glass flows, of a receiving cup beneath said opening into which the glass flows and accumulates to form a gob, the lower end of said cup having a restricted opening through which the glass protrudes while accumulating in the cup, a cutter operable periodically between said cup and discharge opening to sever the glass, and means to discharge the glass from said cup.

6. The combination with a receptacle to contain molten glass and provided with a discharge opening, of means forming a heat chamber beneath said opening, the floor of the chamber having an outlet opening, permitting the glass to flow in a stream through the chamber, a cutter, and means to periodically project said cutter across said opening to sever the glass and support the oncoming glass and to then withdraw the cutter without permitting the glass to accumulate on said floor.

7. The method which consists in flowing a stream of molten glass from a discharge outlet in the bottom of a receptacle, accumulating the glass in a forming cup beneath the outlet, surrounding the flowing stream by an enclosed space providing a highly heated atmosphere, periodically severing the glass above said cup, discharging the accumulated gob, and retarding the glass above the cutting point within said enclosed space until the cup is ready to receive the glass for forming the succeeding gob.

8. The combination with a receptacle to contain molten glass and provided with an outlet opening through which the glass flows, of a receiving cup beneath said opening into which the glass flows, a cutter operable to sever the glass between said cup and the flow opening, and means to cause a circulation of the heated gases from the furnace around the glass flowing from said outlet.

9. The combination of a furnace having an extension forming a receptacle into which molten glass flows from the furnace, and a casing surrounding and enclosing said receptacle, the floors of said casing and receptacle being spaced to provide circulation of hot gases from the furnace, said floors being formed with openings through which the glass flows.

10. Apparatus for feeding molten glass comprising a receptacle having a downwardly opening orifice, severing means disposed below the said orifice, and a shaping receptacle disposed below the said severing means, the said receptacle having a continuously open discharge orifice.

11. Apparatus for feeding molten glass comprising a receptacle having a downwardly opening orifice, severing means disposed below the said orifice, and a shaping receptacle disposed below the said severing means, the said receptacle having a continuously open discharge orifice and being composed of sections that are separable to release the glass contained in the said receptacle.

12. In an apparatus for gathering glass from a continuously flowing stream, a fixed bottomless gathering cup composed of partable members, and a shearing member operable above said partable members.

13. In an apparatus for gathering glass from a continuously flowing stream, a fixed bottomless gathering cup composed of partable members, a shearing member operable above said partable members, means for operating the shearing member synchronously with the movement of a mold table, and a separate means for operating the partable members synchronously with the movement of the mold table.

14. In an apparatus for gathering glass from a continuously flowing stream, a fixed bottomless gathering cup composed of partable members, a shearing member operable above said partable members, means for operating the shearing member synchronously with the movement of a mold table, and a separate means for operating the partable members synchronously with the movement of the mold table, said shearing member adapted to be held stationary momentarily during the operation of the partable members.

15. In an apparatus for gathering glass from a continuously flowing stream, a fixed bottomless gathering cup composed of partable members, complementary recesses formed in each member so as to form when said members are closed a bottomless cup having upwardly divergent walls, a shearing member operable above said partable members, means for operating the shearing member and partable members at intervals.

16. In an apparatus for gathering glass from a continuously flowing stream, a fixed bottomless gathering cup composed of partable members located in the path of said stream, complementary recesses formed in each member so as to form when said members are closed a bottomless cup having upwardly divergent walls, a shearing member operable above said partable member, a scraper loosely mounted above said shearing member, means for operating the shearing member and partable members at intervals.

17. In an apparatus for gathering glass from a continuously flowing stream, a bottomless cup permanently located in the path of the stream and composed of partable members provided with complementary recesses which form, when the members are closed, a continuous and uniformly tapered opening, the diameter of which is less at its lower end than its upper end, a shearing member operable at the end of the cup where the opening has the greatest diameter, means for operating the shearing members at intervals, and means for operating the cup members at intervals.

18. The herein described method of delivering glass from a furnace to the molds of a forming machine consisting in establishing a flowing stream of glass; causing the stream to enter a fixed bottomless tapered cup retarding the flow of the lower end of the stream sufficiently to allow a sufficient amount of glass to accumulate therein to form the desired article; interrupting the flow of the stream when a sufficient amount has been accumulated in the cup, and lastly discharging the gathered mobile mass into a mold.

19. In an apparatus for gathering glass from a continuously flowing stream, a fixed bottomless gathering cup composed of partable members, a shearing member located above said partable members, means for operating the shearing member synchronously with the movement of the mold table, separate means for operating the partable members synchronously with the movement of the mold table, said partable members being separated after one movement of the shearing member, and coming together again before the reverse movement of the shearing member.

20. The apparatus of claim 13, in which the shearing member is operated forward to sever the stream and remains in that position until the partable members of the gathering cup are separated and brought together again, after which the shearing member is withdrawn.

Signed at Toledo, in the county of Lucas and State of Ohio, this 4th day of March, 1919.

LEONARD D. SOUBIER.